CIRCUIT RESPONSIVE TO INFORMATION PULSE GROUPS

Filed Oct. 19, 1966

INVENTOR
ELEUTHERE POUMAKIS
BY
Laurence J. Marhoefer
ATTORNEY

United States Patent Office 3,508,160
Patented Apr. 21, 1970

3,508,160
CIRCUIT RESPONSIVE TO INFORMATION PULSE GROUPS

Eleuthere Poumakis, Danville, Calif., assignor to Potter Instrument Company, Inc., Plainview, N.Y., a corporation of New York Filed Oct. 19, 1966, Ser. No. 587,924
Int. Cl. H03k 5/20
U.S. Cl. 328—119 4 Claims

ABSTRACT OF THE DISCLOSURE

The specification and drawings disclose a noise-immune envelope detection circuit for reading information recorded in a block format. A first bistable multivibrator circuit is biased initially to provide high noise immunity. An integrator couples the output of this first bistable circuit to a second bistable circuit which lowers the initial bias after the first bistable circuit has been triggered a certain number of times.

This invention relates to a circuit which is responsive to a group of information pulses, and, more particularly, to an improved circuit which is responsive to information pulse groups read from a high density, self-clocking magnetic recording in which the information is recorded in a block format.

Information is advantageously recorded on certain magnetic media, such as a continuously-circulating, endless magnetic tape loop, in one or more data blocks which are separated by a gap or gaps in which no information is recorded. As will be understood by those skilled in the art, it is desirable to generate a control signal indicating when the transducer is reading information from such a tape and when it is disposed adjacent a gap.

Noise signals from the gaps seriously complicate the problem of providing a control signal generating circuit since the noise signal generated as a gap passes the transducer may be equal in amplitude to amplitude of certain of the information pulses. Additionally, a satisfactory circuit must discriminate between the end of an information block and a momentary loss of signal (known in the art as a drop-out) due to a tape defect or the like, and should be relatively simple and inexpensive to construct.

One object of this invention is the provision of an improved circuit which is responsive to groups of information pulses but relatively insensitive to noise signals of substantially equal magnitude.

Another object of this invention is the provision of a relatively simple, inexpensive circuit for producing a control signal indicating that a data block is being read.

Other and further objects of this invention will appear from the following description.

Briefly, this invention contemplates the provision of a bistable multivibrator which is biased to favor one stable state by means of a bias circuit whose output decreases after the multivibrator has been triggered a predetermined number of times. The multivibrator is thusly biased so that it requires initially a relatively large input level to trigger it; after the multivibrator has been triggered the predetermined number of times by signals of this magnitude, it is then so biased that input signals of a smaller magnitude are effective to trigger it.

In a preferred embodiment of the invention, the input of a current sensitive Schmitt trigger circuit is biased by a current source which includes a voltage sensitive Schmitt trigger that is triggered by an integrator coupled to the output of the current sensitive trigger. When the output of the integrator reaches a certain level, the voltage responsive Schmitt trigger switches, reducing the bias current.

Having briefly described this invention, it will be described in greater detail along with other objects and advantages in the following detailed description of a preferred embodiment which may be best understood by reference in the accompanying drawings which form part of the instant specification and which are to be read in conjunction therewith and which like reference numerals are used to indicate like parts in the various views.

Figures 1, 2:
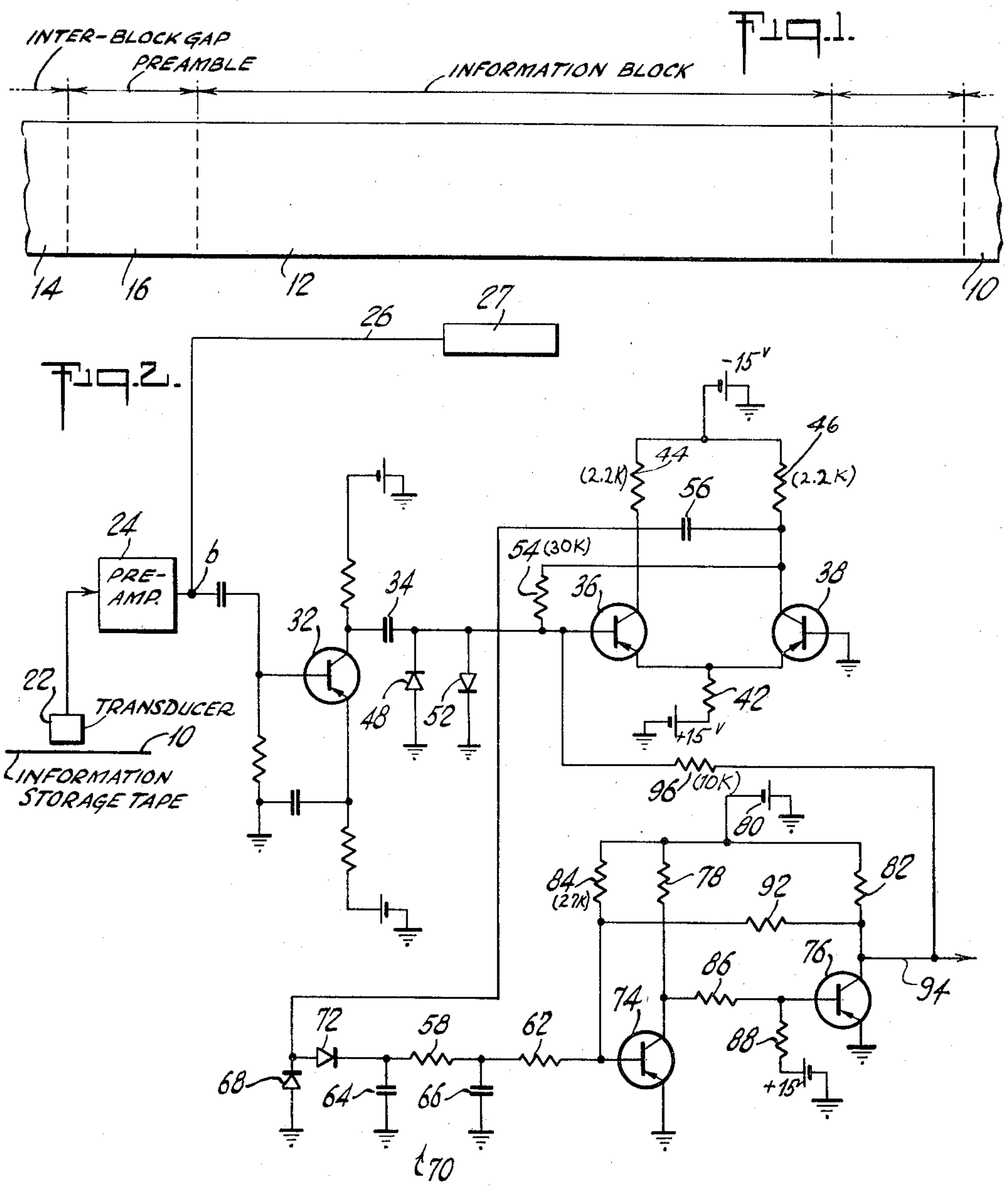
FIGURE 1 is a plan view of a fragment of magnetic storage tape.
FIGURE 2 is a schematic view of a circuit of this invention, showing certain typical values of components for a specific embodiment of the invention.
Figure 3:
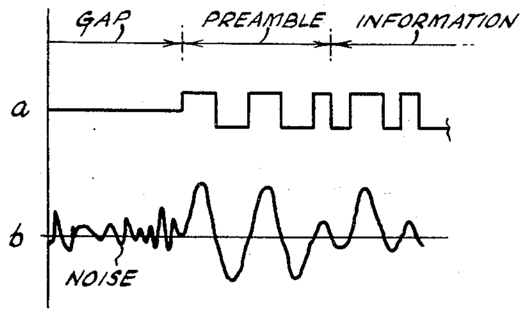
FIGURE 3 is a diagram illustrating the recorded information on the tape of FIGURE 1, and the corresponding analogue waveform at various indicated points of FIGURE 2.

Referring now to FIGURE 1 of the drawings, information recorded on a tape 10 in a self-clocking mode, for example, is arranged in a so-called block format in which information blocks 12 are separated by a gap or gaps 14. As will be appreciated by those skilled in the art, the block 12 is preceded by a preamble 16 which comprises a series of binary ones (1) to enable synchronization of the clocking circuits followed by a binary zero (0) to definitively mark the end of the preamble. FIGURE 3*a* illustrates typical transitions recorded on one track of tape 10. It will be understood that in the self-clocking recording illustrated, a binary 1 is encoded as a relatively long spacing between transitions and a binary 0, a relatively short space.

Referring now to FIGURE 2, as the tape 10 moves relative to a transducer 22, the flux transitions thereon induce a signal in the transducer which is coupled to the input of a preamplifier 24. A lead 26 couples the output of the preamplifier to signal shaping, amplifying and detecting circuits 27 in order to extract from the signal its information content. As details of the transducer, preamplifier and circuits are well known to those skilled in the art, they are not shown or explained in detail here.

The output of the preamplifier 24 is shown in FIGURE 3*b*. It should be noted that although the information on tape 10 is encoded in terms of the spacing between flux transitions, inherently the amplitude of the signal resulting from the detection of a binary 1 exceeds the amplitude of the signal resulting from a binary 0. In addition, it should be noted that the noise signal generated as the gap 14 passes the transducer may equal the signal resulting from a binary 0.

In order to determine when the transducer 22 is disposed to read information and when it is disposed adjacent a gap, the output of preamplifier 24 is capacitively coupled to the base of PNP transistor 32 operating as a class A amplifier and serving as an input stage for the pulse group detection circuit of this invention.

The output signal from transistor 32 is coupled from its collector by a capacitor 34 to a current sensitive Schmitt trigger circuit which includes a pair of PNP transistors 36 and 38. The signal is coupled to the base of transistor 36 which is clamped near ground by a pair of diodes 48 and 52 of opposite polarity. The diodes prevent an accumulation of charge on capacitor 34 and limit the maximum input potential swing to about ±.7 volt—the forward breakdown potential of the diodes.

To provide bistable operation, emitters of transistors 36 and 38 are coupled through a common resistor 42 to the positive terminal of a 15 volt potential source, the negative terminal of which is grounded. Resistors 44 and 46, which are of equal resistance, respectively couple the collector of these transistors to the negative terminal of a 15 volt power supply, the positive terminal of which is grounded.

A feed back resistor 54 couples the collector of transistor 38 to the base of transistor 36. It should be noted that in the absence of an input signal to the base of transistor 36, current flow through resistor 54 maintains transistor 36 in a conducting state. Transistor 38 is cut off.

A capacitor 56 couples the output of the current sensitive Schmitt trigger from the collector of transistor 38 to the input of an R-C network of resistors 58 and 62 and capacitors 64 and 66 which integrate the positive polarity signal from capacitor 56—diodes 68 and 72 eliminate negative spikes from the input to the integrator network.

The integrator network is coupled to a voltage sensitive Schmitt trigger which includes transistors 74 and 76 whose emitters are coupled to ground, and whose collectors are coupled to the negative terminal of a 15 volt supply by resistors 78 and 82, respectively.

A resistor 84 couples the base of transistor 74 to the negative terminal of supply 80, biasing transistor 74 to saturation; a resistor 88 couples the base of transistor 76 to the positive terminal of a 15 volt supply, biasing transistor 76 off. A resistor 86 couples the collector of transistor 74 to the base of transistor 76. When the potential on the base of transistor 76 rises above ground due to an accumulation of charge on capacitors 64 and 66, transistor 74 cuts off, causing an increase in current flow in resistor 88 which lowers the potential at the base of transistor 76, turning transistor 76 on.

A control signal output is coupled from the collector of transistor 76 by a lead 94. In addition, the collector of transistor 76 is coupled to the base of transistor 36 by a feed back resistor 96. With transistor 76 cut off, current flow from source 80 through resistors 82 and 96 provides a bias current which tends to maintain conduction in transistor 36. When transistor 76 conducts, this bias current diminishes, reducing the magnitude of input signal required to switch transistor 36.

In operation, in a quiescent state transistors 36 and 74 conduct; transistors 38 and 76 are cut off; and the potential on lead 94 is a negative. The current flow in resistors 54 and 96 bias transistor 36 sufficiently that it can not be driven out of conduction by a noise signal generated in the interblock gap. The signal developed as the preamble passes the transducer 22 is of sufficient magnitude, however, that the positive half cycle of the signal coupled to the base of transistor 36 is sufficient to overcome the bias, stop base current flow to transistor 36 and cut it off.

As the current flow through transistor 36 begins to diminish, the emitter potential of transistor 38 rises above ground and transistor 38 begins to conduct. This reduces the current flow in resistor 54, further tending to cut resistor 36 off. This switching operation continues rapidly until transistor 38 saturates and transistor 36 is fully cut off.

When the input signal on the base of transistor 36 drops, current is again supplied to this base; the transistor begins to conduct. The increased current flow in resistor 42 lowers the emitter potential of transistor 38, cutting it off, and the multivibrator returns to its initial state.

Successive pulses of the preamble trigger the current sensitive multivibrator; capacitor 56 couples the changes in collector potential of the transistor 38 to the input of the integrator. After a number of pulses have been integrated, the potential on the base of transistor 74 rises above ground, cutting transistor 74 off, which in turn causes transistor 76 to conduct. The potential of the collector of transistor 76 rises to approximately ground potential, reducing the bias current coupled by resistor 96 to the base of transistor 36. With the reduced bias on transistor 36, the both long and short pulses from the tape 10 are sufficient to cause switching of the current sensitive multivibrator. While reading an information block, the current sensitive multivibrator is triggered in response to each information pulse which is read from the tape. Output pulses from this multivibrator maintain the potential of integrator 70 above the level required to keep transistor 74 cut off, and lead 94, therefore, rests at ground potential, while the block is being read.

After the block is read, the current sensitive multivibrator stops switching; capacitors 64 and 66 discharge lowering the base potential of transistor 74. The voltage sensitive multivibrator switches, returning lead 94 to a negative potential and thereby reestablishes the bias on transistor 36.

It should be noted that the integrator 70 prevents the potential on lead 94 from changing due to a momentary loss of signal (drop out) in a data block. In addition, it provides a delay in signaling the beginning and ending of the data block, which delays may be made unequal, if desired, by adjusting the hysteresis of the voltage sensitive multivibrator.

It will be understood that certain features and subcombinations are of utility and may be employed without reference to other features and subcombinations. This is contemplated by and is within the scope of the claims. It is further obvious that various changes may be made in details within the scope of the claims without departing from the spirit of the invention. It is, therefore, to be understood that this invention is not to be limited to the specific details shown and described.

What is claimed is:

1. A circuit responsive to at least first and second groups of pulses comprising, in combination:

a transducer for reading information stored in a predetermined format comprising at least said first and second groups of pulses, a first bistable circuit having an input means and an output means, said input means coupling said transducer to said first bistable circuit, means for biasing said first circuit to rest in one stable state when a signal coupled to said input means from said transducer is less than a certain level and to rest in its other stable state when a signal coupled to said input exceeds a certain level, said biasing means including means to cause said first bistable circuit to respond to only said first group of pulses, and means coupled to said output means for altering said bias in response to a switching of said first circuit from said one state to said other state and back to said one state at least once and thereby cause said first bistable circuit to respond to both said first and second groups of pulses.

2. A circuit responsive to a group of pulses as in claim 1 wherein said bias altering means includes an integrating circuit for integrating the output of said first bistable circuit and further includes a second bistable circuit which switches from a first to a second stable state when the output of the integrator reaches a certain level.

3. A circuit responsive to a group of pulses as in claim 1 wherein said input means includes a coupling capacitor and a pair of oppositely poled diodes to prevent accumulation of charge on said capacitor.

4. A circuit responsive to a group of pulses as in claim 3 wherein said first bistable circuit includes a pair of transistors and wherein said bias means controls the base current to one of said pair of transistors.

References Cited

UNITED STATES PATENTS

| | | | |
|---|---|---|---|
| 2,748,272 | 5/1956 | Schrock | 328—181 X |
| 3,013,159 | 12/1961 | DeSautels | 307—290 X |
| 3,080,487 | 3/1963 | Mellott et al. | 307—289 X |
| 3,187,202 | 6/1965 | Case | 307—233 |
| 3,272,949 | 9/1966 | Brown. | |

JOHN S. HEYMAN, Primary Examiner

J. D. FREW, Assistant Examiner

U.S. Cl. X.R.

307—233, 234, 235, 290, 291; 328—119, 192